US010392021B2

(12) United States Patent
Iwashita et al.

(10) Patent No.: US 10,392,021 B2
(45) Date of Patent: Aug. 27, 2019

(54) CONTROL DEVICE IN HYBRID VEHICLE

(71) Applicant: Honda Motor Co.,Ltd., Tokyo (JP)

(72) Inventors: Hideaki Iwashita, Saitama (JP); Kanta Tsuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 15/701,458

(22) Filed: Sep. 12, 2017

(65) Prior Publication Data

US 2018/0072319 A1 Mar. 15, 2018

(30) Foreign Application Priority Data

Sep. 13, 2016 (JP) ................................ 2016-178893

(51) Int. Cl.

| | |
|---|---|
| ***B60W 30/20*** | (2006.01) |
| ***B60W 10/18*** | (2012.01) |
| ***B60W 20/00*** | (2016.01) |
| ***B60K 6/26*** | (2007.10) |
| ***B60K 6/36*** | (2007.10) |
| ***B60K 6/48*** | (2007.10) |
| ***B60W 10/06*** | (2006.01) |
| ***B60W 10/08*** | (2006.01) |
| ***B60W 10/113*** | (2012.01) |

(52) U.S. Cl.

CPC ............... *B60W 30/20* (2013.01); *B60K 6/26* (2013.01); *B60K 6/36* (2013.01); *B60K 6/48* (2013.01); *B60W 10/06* (2013.01); *B60W 10/08* (2013.01); *B60W 10/113* (2013.01); *B60W 10/182* (2013.01); *B60W 20/00* (2013.01); *B60K 2006/4825* (2013.01); *B60W 2030/206* (2013.01); *B60W 2710/188* (2013.01); *Y02T 10/6221* (2013.01); *Y02T 10/6286* (2013.01); *Y02T 10/7077* (2013.01)

(58) Field of Classification Search

CPC .... B60W 30/20; B60W 10/113; B60W 10/08; B60W 10/06; B60W 10/182; B60W 20/00; B60W 2030/206; B60W 2710/188; B60K 6/48; B60K 6/36; B60K 6/26; B60K 2006/4825; Y02T 10/6221; Y02T 10/6286; Y02T 10/7077

USPC .......................................................... 701/22

See application file for complete search history.

(56) References Cited

FOREIGN PATENT DOCUMENTS

| | | |
|---|---|---|
| CN | 103747994 | 4/2014 |
| CN | 104203683 | 12/2014 |

(Continued)

OTHER PUBLICATIONS

Office Action of China Counterpart Application, with English translation thereof, dated May 13, 2019, pp. 1-10.

*Primary Examiner* — Brian P Sweeney
(74) *Attorney, Agent, or Firm* — JCIPRNET

(57) ABSTRACT

Noise and vibration occurring when a parking lock is released can be efficiently reduced in the hybrid vehicle which includes an internal combustion engine and an electric motor serving as the driving sources and a stepped type transmission divided into two systems of a shift shaft at an odd shift stage side and a shift shaft at an even shift stage side. A 2-speed stage is selected as a pre-shift stage set when a meshing member is meshed with a parking lock gear and a parking lock mechanism has a parking lock state. The 2-speed driving gear is joined to an output shaft using a second engagement switching mechanism in a state in which the 2-speed stage is set as the pre-shift stage so that a larger inertial mass can be secured as an inertial mass of a parking lock gear and members joined to an output shaft.

6 Claims, 6 Drawing Sheets

(56) References Cited

FOREIGN PATENT DOCUMENTS

| | | |
|---|---|---|
| CN | 105857053 | 8/2016 |
| JP | 2014055614 | 3/2014 |
| JP | 2015-175463 | 10/2015 |

CONTROL DEVICE IN HYBRID VEHICLE

CROSS-REFERENCE TO RELATED APPLICATION

This application claims the priority benefit of Japan Application no. 2016-178893, filed on Sep. 13, 2016. The entirety of the above-mentioned patent application is hereby incorporated by reference herein and made a part of this specification.

BACKGROUND OF THE INVENTION

Field of the Invention

The present invention relates to a control device in a hybrid vehicle which controls operations of driving sources and a transmission in the hybrid vehicle which includes an internal combustion engine and an electric motor serving as the driving sources and a stepped type transmission divided into two systems of a shift shaft at an odd shift stage side and a shift shaft at an even shift stage side.

Description of Related Art

In the related art, there are hybrid vehicles including engines (internal combustion engines) and motors (electric motors) serving as driving sources. In such hybrid vehicles, there are hybrid vehicles including a stepped type transmission in which a plurality of shift stages are switched and set so that a driving force of at least any of internal combustion engines and electric motors can be transferred to drive wheels.

As a transmission used for a hybrid type vehicle as described above, for example, as illustrated in Patent Document 1, there is a twin clutch type transmission which includes a first clutch (an odd stage clutch) in which an input shaft in a first shift mechanism constituted of shift stages of odd stages (1-, 3-, and 5-speed stages and the like) and an engine output shaft in an internal combustion engine can be connected and disconnected and a second clutch (an even stage clutch) in which an input shaft in a second shift mechanism constituted of shift stages of even stages (2-, 4-, and 6-speed stages and the like) and the engine output shaft therein can be connected and disconnected and in which the two clutches are alternately switched so that shifting between the stages is performed. Furthermore, as such a twin clutch type transmission, there is a transmission constituted to join a rotating shaft in an electric motor to an input shaft in a first shift mechanism.

Also, the above-described hybrid vehicle includes, for example, a parking lock mechanism constituted of a parking lock gear provided in a rotating shaft in a transmission and a parking pole (a meshing member) meshed with the parking lock gear. Moreover, parking or stopping is performed by setting a shift lever to a parking stage without using a side brake is some cases when the hybrid vehicle is stopped at a place with a gradient such as a hill road and the like. In this case, twisting occurs in a drive shaft in the hybrid vehicle due to force acting on the hybrid vehicle in a direction in which a gradient thereof is lowered. Thus, the parking pole receives a reaction force of the drive shaft and is tilted. When meshing of the parking pole is released in this state so that a parking lock is released, a force from which such twist and tilt originate is removed so that vibration (a shake) occurs in units of an engine, a motor, a transmission, and the like (a power plant). Particularly, since the parking pole does not receive friction and resistance from other members, such shake occurs at a fast rate and lasts for a long time. Thus, there is a problem about the vibration (the shake) of the parking pole transferred to the units in a hybrid vehicle body as vibration (a shock).

PRIOR ART DOCUMENT

Patent Documents

[Patent Document 1] Japanese Unexamined Patent Application Publication No. 2015-175463

SUMMARY OF THE INVENTION

The present invention was made in view of the above-described circumstances, and an objective thereof is to effectively reduce noise and vibration occurring when a parking lock is released in a hybrid vehicle which includes a stepped type transmission divided into two systems of a shift shaft at an odd shift stage side and a shift shaft at an even shift stage side.

In order to solve the above-described problems, the present invention includes a control device in a hybrid vehicle, including: an internal combustion engine (2) and an electric motor (3) serving as driving sources in the hybrid vehicle; a transmission (4) which includes: a first input shaft (IMS) connected to the electric motor (3) and optionally connected to an engine output shaft (2*a*) in the internal combustion engine (2) with a first clutch (C1); a second input shaft (SS) optionally connected to the engine output shaft (2*a*) in the internal combustion engine (2) with a second clutch (C2); an output shaft (CS) configured to output power toward drive wheels (WR and RL); a first shift mechanism (G1) including a plurality of shift gears (43, 45, and 47) provided between the first input shaft (IMS) and the output shaft (CS) and a first engagement switching mechanism (41, 81, or 82) which optionally engages any of the plurality of shift gears with the first input shaft (IMS) or the output shaft (CS) and by which any one of odd shift stages and even shift stages is able to be set; a second shift mechanism (G2) including a plurality of other shift gears (42, 44, and 46) provided between the second input shaft (SS) and the output shaft (CS) and a second engagement switching mechanism (83 or 84) which optionally engages any of the plurality of other shift gears with the second input shaft (SS) or the output shaft (CS) and by which the other of the odd shift stages and the even shift stages is able to be set; a reverse stage shift mechanism (GR) configured to be able to set a reverse shift stage using a third shift mechanism (85) disposed between the first input shaft (IMS) and the output shaft (CS); and a parking lock mechanism (59) configured to include a parking lock gear (54) provided in the output shaft (CS) and a meshing member (57) which is able to be meshed with the parking lock gear (54) and lock the output shaft (CS) by meshing the meshing member (57) with the parking lock gear (54); and a control unit (10) configured to control driving of the hybrid vehicle using the internal combustion engine (2) and the electric motor (3), wherein the control unit (10) selects a lowest shift stage (a 2-speed stage) which is able to be set by the second shift mechanism (G2) as a preparation shift stage set when the parking lock mechanism (59) is a parking lock state.

According to the present invention, when the meshing member is meshed with the parking lock gear and thus the parking lock mechanism has a parking lock state, a pre-shift stage set by the second shift mechanism is the lowest shift stage which is settable by the second shift mechanism (the 2-speed stage in the embodiment). The shift gear for the lowest shift stage is joined to the output shaft using the second engagement switching mechanisms in a state in which the pre-shift stage of the lowest shift stage has been set so that a larger inertial mass can be secured as an inertial mass (an inertia) of the parking lock gear and the members joined to the output shaft. Thus, noise and vibration occurring due to a release of the parking lock state in the parking lock mechanism can be effectively reduced.

Also, in the control device in the hybrid mechanism, the transmission (4) is constituted such that a reverse stage (R) is set by the reverse stage shift mechanism (GR) and a reverse driving force is able to be transferred to the drive wheels (WR and WL) by setting the lowest shift stage (a 1-speed stage) in the first shift mechanism (G1), and the control unit (10) may set the lowest shift stage (the 2-speed stage) which is able to be set by the second shift mechanism (G2) as a preparation shift stage set at the time of the parking lock state if it is determined that the hybrid vehicle can be started using driving of the electric motor when a parking lock of the parking lock mechanism (59) is released, and set a reverse shift stage (R) using the reverse stage shift mechanism (GR) as a preparation shift stage set at the time of the parking lock state if it is determined that the hybrid vehicle cannot be started using the driving of the electric motor when the parking lock of the parking lock mechanism is released.

As an aspect in this case, a storage battery (30) configured to supply electric power used to drive the electric motor; and a remaining capacity detection unit (34) configured to detect a remaining capacity of the storage battery may be provided, wherein the control unit (10) determines whether the hybrid vehicle is able to be started using the driving of the electric motor on the basis of the remaining capacity of the storage battery (30) detected by the remaining capacity detection unit (34). In other words, examples of a case in which the hybrid vehicle cannot be started using the driving of the electric motor mentioned herein include a case in which a remaining capacity of the storage battery configured to supply electric power to the electric motor is insufficient. Note that such a case may include a case in which abnormality such as failure in the electric motor or peripheral devices thereof in addition to this.

If the lowest shift stage which can be set by the second shift mechanism is set as a preparation shift stage set at the time of the parking lock state, when a reverse (rearward movement) position is selected from the parking position as a shift position, two operations, i.e., an operation associated with a parking lock release and setting of the lowest shift stage (the 1-speed stage) in the first shift mechanism and an operation associated with a release of the shift stage (the lowest shift stage) set by the second shift mechanism and setting of the reverse shift stage using the shift mechanism for the reverse stage are required as an operation of setting the reverse stage using the transmission with the above-described configuration. For this reason, there is a concern about a starting response at the time of rearward movement which cannot be secured. If it is determined that the hybrid vehicle cannot be started using the driving of the electric motor when the parking lock state of the parking lock mechanism is released as described above in the present invention to deal with this, the reverse shift stage is set using the shift mechanism for the reverse stage as the preparation shift stage set at the time of the parking lock state. Thus, since the hybrid vehicle can be moved rearward (in reverse) using only the operation associated with the parking lock release and the setting of the lowest shift stage (the 1-speed stage) in the first shift mechanism even when the hybrid vehicle cannot be started using the driving force of the electric motor, response delays at the time of the starting can be prevented. Note that, if the hybrid vehicle can be started using the driving of the electric motor when a parking lock (a lock) in the parking lock mechanism is released, since the hybrid vehicle is started in reverse by driving the electric motor in reverse if the parking lock is released and the lowest shift stage (the 1-speed stage) is set using the first shift mechanism, the lowest shift stage (the 2-speed stage) which can be set by the second shift mechanism is set as the preparation shift stage set at the time of the parking lock state. Thus, noise and vibration occurring due to the release of the parking lock state can be effectively reduced.

In control device in the hybrid vehicle, a shift operation unit (110) by which a driver in the hybrid vehicle performs is a selection operation of a shift position; a shift position detection unit (106) configured to detect the shift position selected by the shift operation unit; and a brake operator (121) operated by the driver to brake the hybrid vehicle may be provided, wherein the control unit waits without performing an operation of setting the reverse shift stage (R) using the rear stage shift mechanism (GR) as a preparation shift set at the time of the parking lock state until a cancel of an operation of the brake operator is detected when a parking position (P) is detected by the shift position detection unit after the operation of the brake operator has been detected.

When the operation of selecting the parking position using the shift operation unit is performed, basically, the operation is performed while the brake operator has been operated (for example, the brake pedal is being stepped). For this reason, when the parking position is selected using the shift operation unit after the operation of the brake operator has been performed, after that, it can be determined that the driver is less likely to start the hybrid vehicle again when the operation of the brake operator is cancelled. Thus, in the present invention, waiting is performed without operating the operation of setting the reverse shift stage as the preparation shift stage until a cancel of the operation of the brake operator is detected when the parking position is detected after the operation of the brake operator has been detected. Thus, since the operation of changing (switching) the pre-shift stage in the parking lock state to the reverse stage is performed after the shift position selected by the shift operation unit due to the driver's intention change (a so-called change in mind) in the hybrid vehicle is less likely to be changed from the parking position to another travel position, a decrease in starting response of the vehicle 1 can be effectively suppressed even when the driver's intention has been changed.

Also, since the shift operation unit is operated to the travel position after the brake operator is operated once again (after the driver steps on the brake pedal) when the driver starts the hybrid vehicle again, there is a temporal room when the preparation shift stage in the parking lock state is changed (the switching of the pre-shift stage) in this case.

On the other hand, when the operation of setting the shift operator to the parking position is performed without performing the operation of the brake operator (without the brake pedal being stepped), the operation may be performed immediately without waiting a change in the preparation shift stage in the parking lock state in the parking lock state.

In the control device in the hybrid vehicle, a start and stop operator (107) configured to operate start and stop an electronic mechanism including the control unit (10) mounted in the hybrid vehicle may be provided, wherein, when a stop operation of the electronic mechanism by the start and stop operation unit (108) has been detected before the cancel of the operation of the brake operator (121) is detected, the control unit (10) performs an operation of setting the reverse shift stage (R) as a preparation shift stage set at the parking lock state when the stop operation has been detected.

When a starting operator (an ignition switch) is subject to a stop operation (an ignition-off operation) while the driver in the hybrid vehicle has been operating the brake operator (for example, the driver is stepping on the brake pedal), the electronic mechanism in the hybrid vehicle has a stop state while the reverse shift stage is not set as the preparation shift stage set at the time of the parking lock state, and thus there is a concern about a response of a rearward start of the hybrid vehicle at the time of starting the next time which is delayed. Thus, in the present invention, when a stop operation of the electronic mechanism has been detected using the start and stop operator before a cancel of the operation of the brake operator is detected as described above, the reverse shift stage is set as the preparation shift stage set at the time of the parking lock state when the stop operation has been detected. In other words, when the ignition is turned off while the driver is stepping on the brake pedal, the reverse stage is set as the pre-shift stage of the parking lock when the ignition is turned off. Thus, when the electronic mechanism in the hybrid vehicle is started the next time, a response delay occurring when the hybrid vehicle is started in reverse can be effectively prevented even when the hybrid vehicle cannot be started using the driving force of the electric motor.

In the control device in the hybrid vehicle, the storage battery (30) may be a high voltage storage battery (30) which is able to exchange electric power with the electric motor (3), and include a transformer (21) which is able to at least step down electric power from the electric motor (3) or the high voltage storage battery (30), and a low voltage storage battery (22) which is able to exchange electric power between the high voltage storage battery (30) and the electric motor (3) with the transformer (21), and an actuator mechanism configured to operate operation units in the transmission (4) is constituted to operate using electric power supplied from the low voltage storage battery (22), and when it is determined that electricity is unable to be stored normally in the low voltage storage battery, the control unit (10) prohibits an operation of changing the preparation shift stage set at the parking lock state.

When it is determined that electricity cannot be stored normally in the low voltage storage battery such as when the transformer (a direct current (DC)-DC converter and the like) fails, the low voltage storage battery needs to be prevented from being depleted (extremely decreased in an amount of stored electricity). For this reason, in the present invention, when it is determined that electricity cannot be stored normally in the low voltage storage battery, an operation of changing the pre-shift stage set in a parking lock state is not performed as the pre-shift stage set at the time of the parking lock state. Thus, a decrease in amount of electricity stored in the low voltage storage battery is minimized even when electricity cannot be stored normally in the low voltage storage battery so that depletion of the low voltage storage battery can be prevented.

Note that the above-described reference numerals in the parentheses are reference numerals of constituent elements in an embodiment which will be described below as examples of the present invention.

DESCRIPTION OF THE EMBODIMENTS

Figure 1:
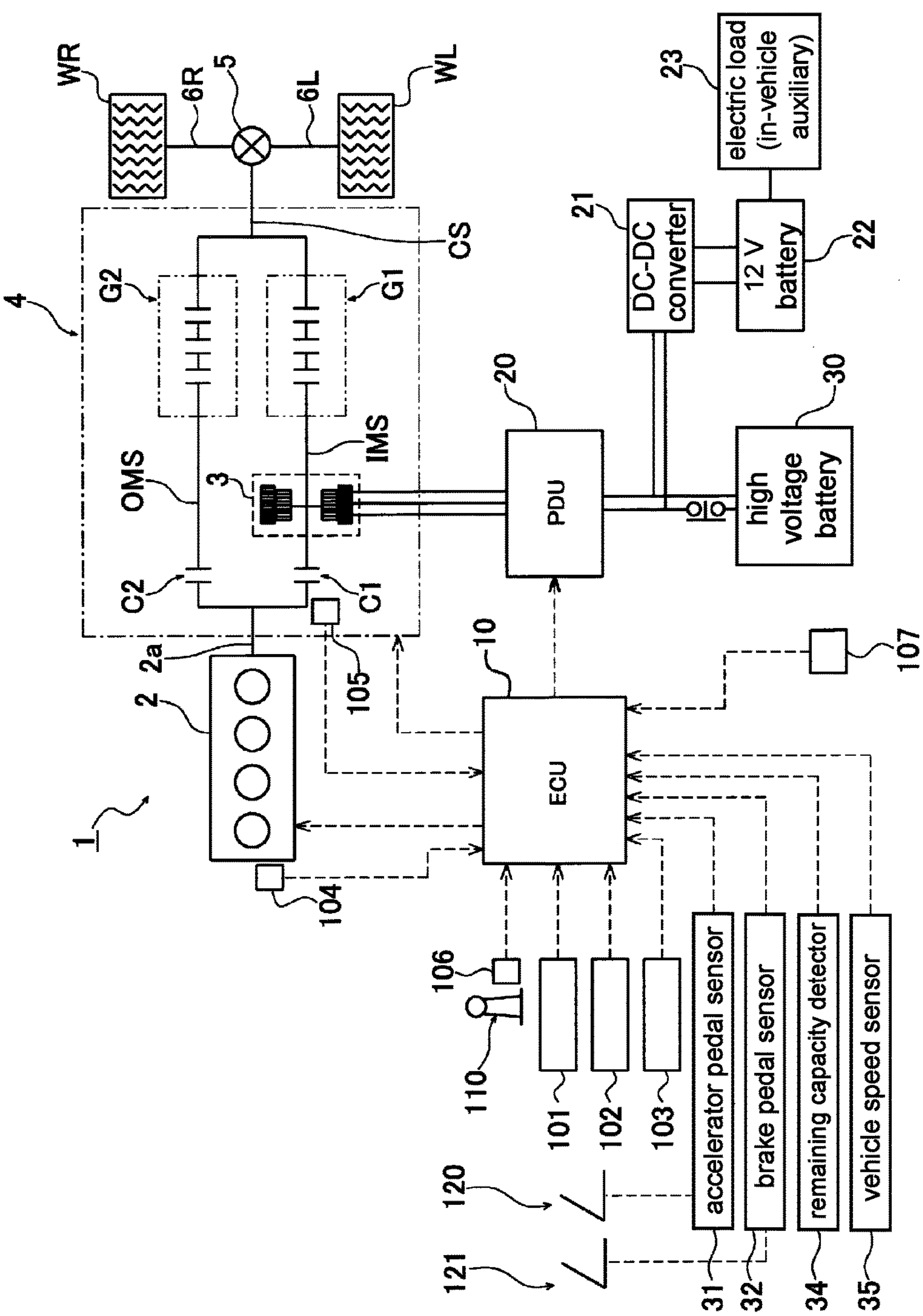
FIG. 1 is a schematic diagram illustrating a configuration example of a hybrid vehicle including a control device according to an embodiment of the present invention.

An embodiment of the present invention will be described in detail below with reference to the accompanying drawings. FIG. 1 is a schematic diagram illustrating a configuration example of a vehicle including a control device in a hybrid vehicle according to an embodiment of the present invention. As shown in FIG. 1, a vehicle 1 in this embodiment is a vehicle of a hybrid vehicle including an internal combustion engine 2 and an electric motor 3 serving as drive sources and further includes a transmission 4, a differential mechanism 5, right and left derive shafts 6R and 6L, and right and left drive wheels WR and WL in addition to a power drive unit (PDU) 20 configured to control the electric motor 3, a high voltage battery (a high voltage storage battery) 30, a direct current (DC)-DC converter (a transformer) 21, a 12 V battery (a low voltage storage battery) 22, and an electric load (a low voltage electric load) 23 constituted of an in-vehicle auxiliary or the like.

Here, the electric motor 3 is a motor and includes a motor generator, and a high voltage battery 30 is a storage battery and includes a capacitor. Furthermore, the internal combustion engine 2 is an engine and includes a diesel engine, a turbo engine, or the like. Rotational drive forces in an internal combustion engine (hereinafter referred to as an "engine") 2 and an electric motor (hereinafter referred to as a "motor") 3 are transferred to the right and left drive wheels WR and WL via the transmission 4, a differential mechanism 5, and drive shafts 6R and 6L.

As shown in FIG. 1, the transmission 4 is constituted of a first input shaft (an inner main shaft which will be described below) IMS connected to a motor 3 and optionally connected to a crankshaft 2*a* in the engine 2 with a first clutch (an odd clutch which will be described below) C1, a second input shaft (an outer main shaft or a secondary shaft which will be described below) OMS (SS) optionally connected to the crankshaft 2*a* in the engine 2 with a second clutch (an even clutch which will be described below) C2, an output shaft CS configured to output power toward the drive wheels WR and WL, a first shift mechanism C1 which is disposed between the first input shaft IMS and the output shaft CS and by which a plurality of shift stages (1, 3, and 5-speed stage, and the like) which belong to odd numbers from the lowest shift stage can be set, and a second shift mechanism G2 which is disposed between the second input shaft OMS (SS) and the output shaft CS and by which a plurality of shift stages (2, 4, 6-speed stages, and the like) which belong to even numbers from the lowest shift stage can be set. Note that, although FIG. 1 illustrates a simplified configuration of the transmission 4, a more detailed configuration included in the transmission 4 is illustrated in a skeleton diagram shown in FIG. 2.

Also, the vehicle 1 includes an electronic control unit (ECU) 10 configured to control the engine 2, the motor 3, the transmission 4, the differential mechanism 5, the DC-DC converter 21, a high voltage battery 30, the 12 V battery 22, and the like. The ECU 10 may be constituted as a single unit or may be constituted of, for example, a plurality of ECUs such as an engine ECU configured to control the engine 2, a motor generator ECU configured to control the motor 3 and the DC-DC converter 21, a battery ECU configured to control the high voltage battery 30, and an automatic transmission (AT)-ECU configured to control the transmission 4. The ECU 10 in this embodiment controls the engine 2 and the motor 3 and performs control of electric power exchange in the high voltage battery 30, the PDU 20, and the 12 V battery 22, control of transmission operation using the transmission 4, and the like.

The ECU 10 performs control so that independent motor travel (EV travel) in which only the motor 3 is used as a power source is performed, independent engine travel in which only the engine 2 is used as a power source is performed, or cooperative driving (HEV travel) in which both of the engine 2 and the motor 3 are used as a power source in accordance with various operating conditions.

Also, the ECU 10 receives inputs of a degree of accelerator pedal opening from an accelerator pedal sensor 31 used to detect a stepping quantity in an accelerator pedal (an accelerator operator) 120, a degree of brake pedal opening from a brake pedal sensor 32 used to detect a stepping quantity in a brake pedal 121, a shift position from a shift position sensor 33 used to detect a shift position (a position such as P, N, D, 1, 2, and the like) based on an operation of a shift lever 110 by a driver, a remaining capacity from a remaining capacity detector 34 used to measure the remaining capacity (a state of charge (SOC)) of the high voltage battery 30, and various signals such as a vehicle speed from a vehicle speed sensor (a vehicle speed detection unit) 35 configured to a vehicle speed as control parameters. Furthermore, an on and off signal from an ignition switch (a start and stop operator in an electronic mechanism) 107 operated by a driver is also input to the ECU 10. Although not illustrated, the ECU 10 may further receive an input of data associated with a road situation (for example, a flat road, an uphill, a downhill, and the like) under which the vehicle 1 is currently travelling from a car navigation system or the like mounted in the vehicle 1.

The engine 2 is an internal combustion engine configured to generate a driving force used to travel the vehicle 1 by mixing a fuel and air and combusting the mixture. The motor 3 functions as a motor configured to generate a driving force used to travel the vehicle 1 using electric energy of the high voltage battery 30 during cooperative driving of the engine 2 and the motor 3 and independently travel of only the motor 3 and functions as a generator configured to generate electricity using regeneration during decelerating of the vehicle 1. The high voltage battery 30 is charged with power (regeneration energy) generated by the motor 3 at the time of the regeneration of the motor 3.

The PDU 20 is connected to the high voltage battery 30 configured to exchange electric power with the motor 3. Here, electric power to be exchanged may include, for example, supply electric power supplied to the motor 3 during driving or an assist operation of the motor 3 and output electric power which is output from the motor 3 when the motor 3 generates electricity using a regeneration operation or boost driving. Moreover, the PDU 20 receives a control command from the ECU 10 and controls driving and electricity-generation of the motor 3. For example, when the motor 3 is driven, DC electric power which is output from the high voltage battery 30 is converted into three-phase alternating current (AC) electric power on the basis of a torque command which is output from the ECU 10 and is supplied to the motor 3. On the other hand, when the motor 3 generates electricity, the three-phase AC electric power which is output from the motor 3 is converted into DC electric power, and the high voltage battery 30 is charged with the DC electric power.

Also, the 12 V battery (a low voltage battery) 22 configured to drive an electric load 23 constituted of various auxiliaries is connected in parallel with the PDU 20 and the high voltage battery 30 with the DC-DC converter (the transformer) 21. The DC-DC converter 21 is, for example, a bidirectional DC-DC converter, and a voltage between terminals in the 12 V battery 22 is stepped up and thus the high voltage battery 30 can be charged with the voltage in a case in which a voltage between terminals in the PDU 20 when terminals in the high voltage battery 30 are connected or the motor 3 is subject to a regeneration operation or boost driving is stepped down to a predetermined voltage value and the 12 V battery 22 is charged with the voltage, and the remaining capacity (SOC) in the high voltage battery 30 is reduced. Furthermore, examples of various auxiliaries constituting the electric load 23 include a defroster unit mounted in the vehicle 1, communication and power transmission devices for the ECU 10, a car audio and accessory devices thereof, a heater unit, lights (lightings), and the like. In this embodiment, actuator mechanisms such as synchromesh mechanism 41, 81, 82, 83, 84, and 85 which will be described included in the transmission 4 are also included in the electric load 23. In other words, the synchromesh mechanism 41, 81, 82, 83, 84, and 85 are operated by electric power of a 12 V battery.

Figure 2:
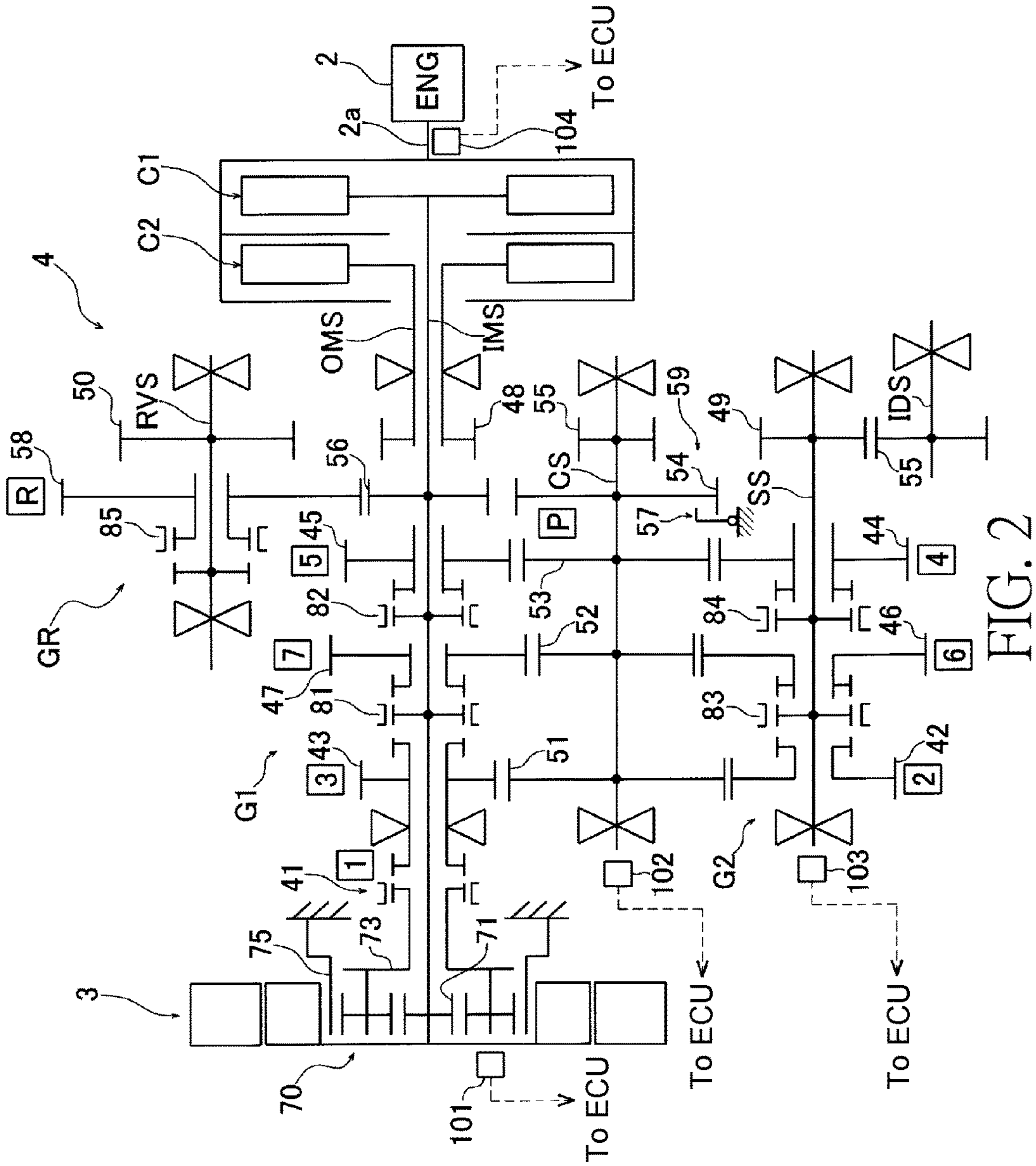
FIG. 2 is a skeleton diagram showing a detailed configuration of a transmission shown in FIG. 1.
Figure 3:
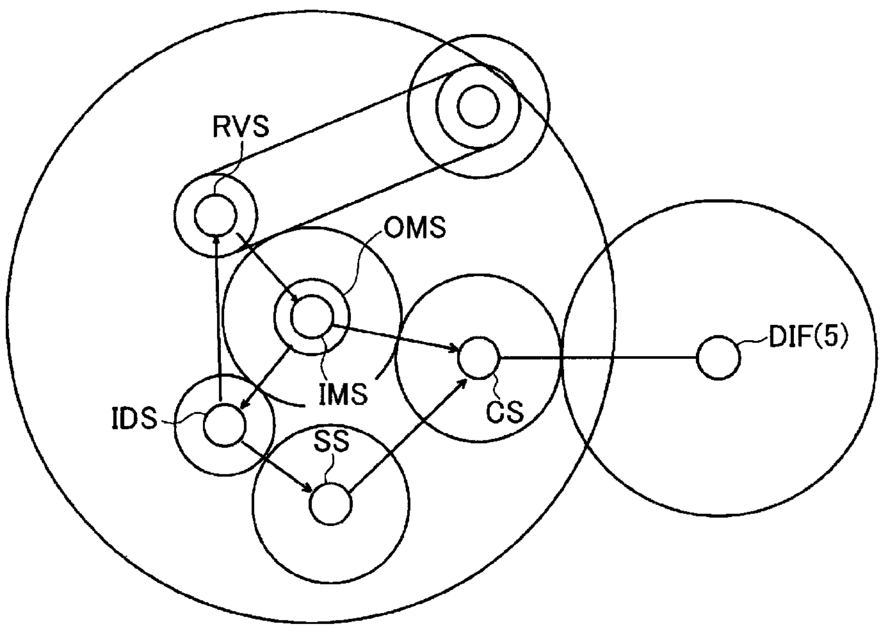
FIG. 3 is a conceptual diagram for describing an engagement relationship of shafts in the transmission shown in FIG. 2.

Next, a detailed configuration example of the transmission 4 included in the vehicle 1 in this embodiment will be described. FIG. 2 is a skeleton diagram illustrating a detailed configuration example of the transmission 4 shown in FIG. 1. FIG. 3 is a conceptual diagram showing an engagement relationship between the shafts of the transmission 4 shown in FIG. 2. The transmission 4 is a parallel shaft type transmission of a forward 7-speed and rearward 1-speed and a dry twin clutch type transmission (a dual clutch transmission).

The crankshaft (an engine output shaft) 2*a* in the engine 2 and the inner main shaft (the first input shaft) IMS connected to the motor 3, the outer main shaft (the second input shaft) OMS configured to form an outer cylinder of the inner main shaft IMS, a secondary shaft (the second input shaft) SS, an idle shaft IDS, and a reverse shaft RVS which are parallel to the inner main shaft IMS, and a counter shaft CS which is parallel to such shafts and configured to form an output shaft are provided in the transmission 4.

Among the shafts, the outer main shaft OMS is engaged with the reverse shaft RVS and the secondary shaft SS with the idle shaft IDS at all times, and the counter shaft CS is further engaged with the differential mechanism 5 (refer to FIG. 1) at all times.

The transmission 4 includes a motor (main shaft) revolution rate sensor 101 configured to detect a revolution rate of the motor 3 (the main shaft IMS), a counter shaft revolution rate sensor 102 configured to detect a revolution rate of the counter shaft CS, and a secondary shaft revolution rate sensor 103 configured to detect a revolution rate of a secondary shaft (the second input shaft) SS. Furthermore, the transmission 4 includes a crankshaft revolution rate sensor 104 configured to detect a revolution rate of the crankshaft 2*a* in the engine 2. Detected values of revolution rates detected by the motor revolution rate sensor 101, the counter shaft revolution rate sensor 102, the secondary shaft revolution rate sensor 103, and the crankshaft revolution rate sensor 104 are input to the ECU 10.

The transmission 4 includes the odd stage clutch (the first clutch) C1 and the even stage clutch (the second clutch) C2. The odd stage clutch C1 and the even stage clutch C2 are dry type clutches. The odd stage clutch C1 is coupled to the inner main shaft IMS. The even stage clutch C2 is coupled to the outer main shaft OMS (a part of the second input shaft) and is joined to the reverse shaft RVS and the secondary shaft SS (a part of the second input shaft) via the idle shaft IDS from a gear 48 fixed to the outer main shaft OMS.

A sun gear 71 in a planetary gear mechanism 70 is fixedly disposed at a predetermined place near the motor 3 in the inner main shaft IMS. Furthermore, a ring gear 75 and a carrier 73 in the planetary gear mechanism 70, a 3-speed driving gear 43, a 7-speed driving gear 47, and a 5-speed driving gear 45 are disposed on an outer circumference of the inner main shaft IMS in order from the left in FIG. 2. Note that the 3-speed driving gear 43 is also used as a 1-speed driving gear. A 1-speed synchromesh mechanism 41 is provided between the carrier 73 in the planetary gear mechanism 70 and the 3-speed driving gear 43 to be able to slide in an axial direction thereof.

The 3-speed driving gear 43, the 7-speed driving gear 47, and the 5-speed driving gear 45 can rotate relative to the inner main shaft IMS, and the 3-speed driving gear 43 can be joined to the carrier 73 in the planetary gear mechanism 70 with the 1-speed synchromesh mechanism 41. In addition, a 3-7-speed synchromesh mechanism 81 is provided in the inner main shaft IMS between the 3-speed driving gear 43 and the 7-speed driving gear 47 to be able to slide in the axial direction thereof, and a 5-speed synchromesh mechanism 82 is provided therein to correspond to the 5-speed driving gear 45 and to be able to slide in the axial direction thereof. A synchromesh mechanism corresponding to a desired gear stage is caused to slide and synchronizes with the gear stage so that the gear stage is joined to the inner main shaft IMS. The first shift mechanism G1 used to realize shift stages of odd stages is constituted of the gear and the synchromesh mechanism provided in association with the inner main shaft IMS. Note that the above-described driving gears 43, 45, and 47 are odd stage gears according to the present invention, and the above-described synchromesh mechanisms 41, 81, and 82 are first synchronous coupling devices. The driving gears 43, 45, and 47 in the first shift mechanism G1 are meshed with corresponding driven gears (output gears) 51, 52, and 53 provided in the counter shaft CS and rotatably drive the counter shaft CS.

A 2-speed driving gear 42, a 6-speed driving gear 46, and a 4-speed driving gear 44 are relatively rotatably disposed on an outer circumference of the secondary shaft SS (the second input shaft) in order from the left in FIG. 2. In addition, a 2-6-speed synchromesh mechanism 83 is provided in the secondary shaft SS between the 2-speed driving gear 42 and the 6-speed driving gear 46 to be able to slide in the axial direction thereof, and a 4-speed synchromesh mechanism 84 is provided therein to correspond to the 4-speed driving gear 44 and to be able to slide in the axial direction thereof. Also in this case, a synchromesh mechanism corresponding to a desired gear stage is caused to slide and synchronizes with the gear stage so that the gear stage is joined to the secondary shaft SS (the second input shaft). The second shift mechanism G2 used to realize shift stages of even stages is constituted of the gear and the synchromesh mechanism provided in association with the secondary shaft SS (the second input shaft). Note that the above-described driving gears 42, 44, and 46 are even stage gears according to the present invention, and the above-described synchromesh mechanisms 83 and 84 are second synchronous coupling devices. The driving gears in the second shift mechanism G2 are also meshed with the corresponding driven gears 51, 52, and 53 provided in the counter shaft CS and rotatably drive the counter shaft CS. Note that a gear 49 fixed to the secondary shaft SS is coupled to a gear 55 in the idle shaft IDS and is coupled from the idle shaft IDS to the even stage clutch C2 with the outer main shaft OMS.

A reverse gear 58 is relatively rotatably disposed in an outer circumference of the reverse shaft RVS. Furthermore, a gear 50 in which a reverse synchromesh mechanism (a reverse synchronous engagement device) 85 is provided to be able to slide in the axial direction thereof to correspond to the reverse gear 58 and is engaged with the idle shaft IDS is fixed to the reverse shaft RVS. A reverse stage shift mechanism (a shift mechanism for a reverse stage) GR used to realize a reverse stage is constituted of the gears and synchromesh mechanisms provided in association with the reverse shaft RVS.

When the vehicle 1 is moved rearward (travels in reverse), the reverse synchromesh mechanism 85 is engaged and a first synchromesh mechanism 41 is engaged so that the even stage clutch C2 is engaged. Thus, rotation of the even stage clutch C2 is transferred to the reverse shaft RVS via the outer main shaft OMS and the idle shaft IDS so that the reverse gear 58 is rotated. The reverse gear 58 is meshed with a gear 56 in the inner main shaft IMS, and the inner main shaft IMS rotates in a direction opposite to that when it moves forward when the reverse gear 58 rotates. The rotation of the inner main shaft IMS in the opposite direction thereof is transferred from the carrier 73 in the planetary gear mechanism 70 to the 3-speed driving gear 43 via the 1-speed synchromesh mechanism 41 and then is transferred to the counter shaft CS.

The 2-3-speed driven gear 51, the 6-7-speed driven gear 52, the 4-5-speed driven gear 53, a parking gear 54, and a final driving gear 55 are fixedly disposed in the counter shaft CS in order from the left in FIG. 2. The final driving gear 55 is meshed with a differential ring gear (not shown) in the differential mechanism 5 and thus rotation of the counter shaft CS is transferred to an input shaft (that is, a vehicle propulsion shaft) in the differential mechanism 5.

Also, a parking pole (a meshing member) 57 meshed with the parking gear 54 is provided, and a parking lock mechanism 59 configured to lock the output shaft CS and the drive wheels WR and WL to be rotated is constituted of the parking gear 54 and the parking pole 57.

In the transmission 4 with the above-described configuration, the 2-speed driving gear 42 is coupled to the secondary shaft SS when a synchronizing sleeve in the 2-6-speed synchromesh mechanism 83 slides to the left, and the 6-speed driving gear 46 is coupled to the secondary shaft SS when the synchronizing sleeve therein slides to the right. Furthermore, the 4-speed driving gear 44 is coupled to the secondary shaft SS when a synchronizing sleeve in the 4-speed synchromesh mechanism 84 slides to the right. The even stage clutch C2 is engaged in a state in which an even driving gear stage is selected in this way so that the transmission 4 is set to an even shift stage (a 2-speed, a 4-speed, or a 6-speed).

The 3-speed driving gear 43 is coupled to the inner main shaft IMS and thus a 3-speed-shift stage is selected when a synchronizing sleeve in the 3-7-speed synchromesh mechanism 81 slides to the left, and the 7-speed driving gear 47 is coupled to the inner main shaft IMS and thus a 7-speed-shift stage is selected when the synchronizing sleeve therein slides to the right. Furthermore, the 5-speed driving gear 45 is coupled to the inner main shaft IMS and thus a 5-speed-shift stage is selected when a synchronizing sleeve in the 5-speed synchromesh mechanism 82 slides to the right. The 1-speed synchromesh mechanism 41 is engaged in a state (a neutral state) in which the synchromesh mechanisms 81 and 82 do not select any of the gears 43, 47, and 45 so that rotation of the planetary gear mechanism 70 is transferred from the carrier 73 to the counter shaft CS via the gear 43 and thus a 1-speed-shift stage is selected. The odd stage clutch C1 is engaged in a state in which an odd driving gears step is selected in this way so that the transmission 4 is set to an odd shift stage (a 1-speed, a 3-speed, a 5-speed, or a 7-speed).

Determination in a shift stage to be realized in the transmission 4 and control used to realize the shift stage (selection of a shift stage in the first shift mechanism G1 and the second shift mechanism G2, that is, switching control of synchronous, control of engagement and disengagement between the odd stage clutch C1 and the even stage clutch C2, and the like) are performed by the ECU 10 in accordance with driving situations as well known in the related art.

Also, in the control device in the hybrid vehicle in this embodiment, when a parking position is selected through an operation of the shift lever by a driver and thus the parking lock mechanism 59 is in a parking lock state, control is performed so that a 2-speed stage (the lowest shift stage which can be set by the second shift mechanism G2) as a pre-shift stage (a preparation shift stage) set by the transmission 4. The specific content of such control will be described in detail below.

Figure 4:
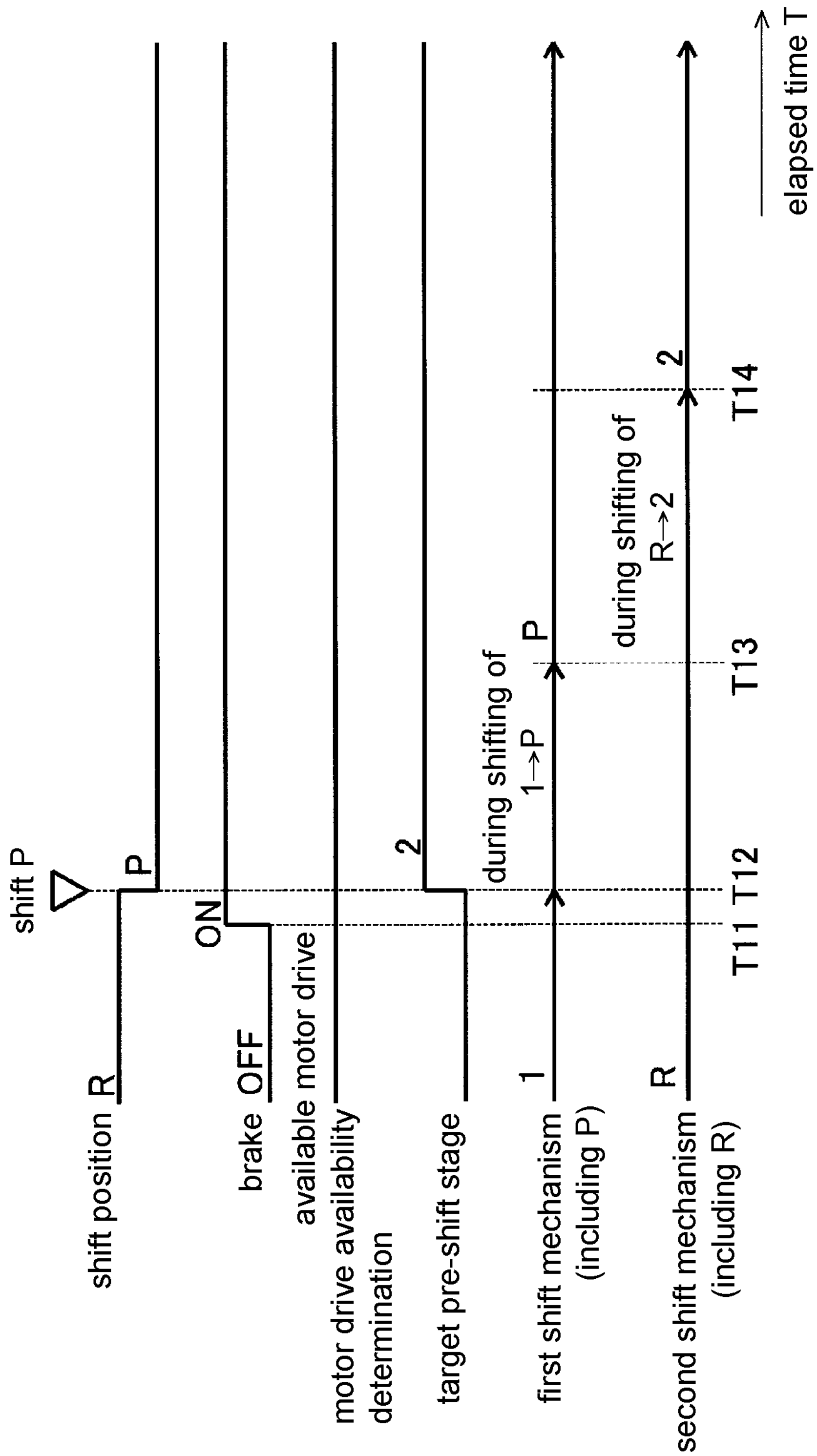
FIG. 4 is a timing chart for describing a procedure in which a pre-shift stage in a parking lock state is set.

FIG. 4 is a timing chart for describing determination in which a pre-shift stage in a parking lock state is set to the 2-speed stage. The timing chart of FIG. 4 and FIG. 5 which will be illustrated below illustrate a shift position selected through an operation of the shift lever 110 by the driver, the presence or absence of an operation of the brake pedal 121 by the driver (on/off of the braking), determination concerning whether the vehicle 1 can be started (driven) using driving of the motor 3 (motor drive availability determination), a target value (a target pre-shift stage) of the pre-shift stage set by the second shift mechanism G2 or a third shift mechanism G3 at the time of a parking lock state, a shift stage or a pre-shift stage set by the first shift mechanism G1 and a shift stage or a pre-shift stage set by the second shift mechanism G2, and a change in elapsed times T. Note that the shaft stage or the pre-shift stage set by the first shift mechanism G1 mentioned herein includes a parking lock state (P) by a parking lock mechanism, and the shift stage set by the second shift mechanism G2 includes a reverse stage (R) set by the reverse stage shift mechanism GR. Furthermore, determination concerning whether the vehicle 1 can be started (driven) using driving of only the motor 3 is performed on the basis of the remaining capacity (SOC) of the high voltage battery 30 configured to supply electric power to the motor 3.

In the timing chart of FIG. 4, first, a brake is switched on through an operation (a stepping operation) of the brake pedal 121 by the driver at time T11. Subsequently, a shift position is switched from a reverse (R) position to a parking (P) position through an operation of the shift lever 110 by the driver at time T12. When it is determined that the vehicle 1 can be started (driven) using the driving of only the motor 3 at this time, the target pre-shift stage in the parking lock state is set to the 2-speed stage. Subsequently, an operation of switching the 1-speed stage set by the first shift mechanism G1 until then to the parking position (P) is performed between time T12 and time T13, and switching to the parking position (P) has been completed at time T13. On the other hand, an operation of switching the reverse (R) stage set as a pre-shift stage until then to the 2-speed stage set by the second shift mechanism G2 is performed between time T13 and time T14, and switching to the 2-speed stage has been completed at time T14. Thus, the pre-shift stage in the parking lock state is changed to the 2-speed stage. In other words, in the control shown in FIG. 4, it is determined whether the pre-shift stage is changed to the 2-speed stage at a timing at which the shift position is switched to the parking position (P) at time T12, and then such determination is maintained (a change in determination is not performed).

Figure 5:
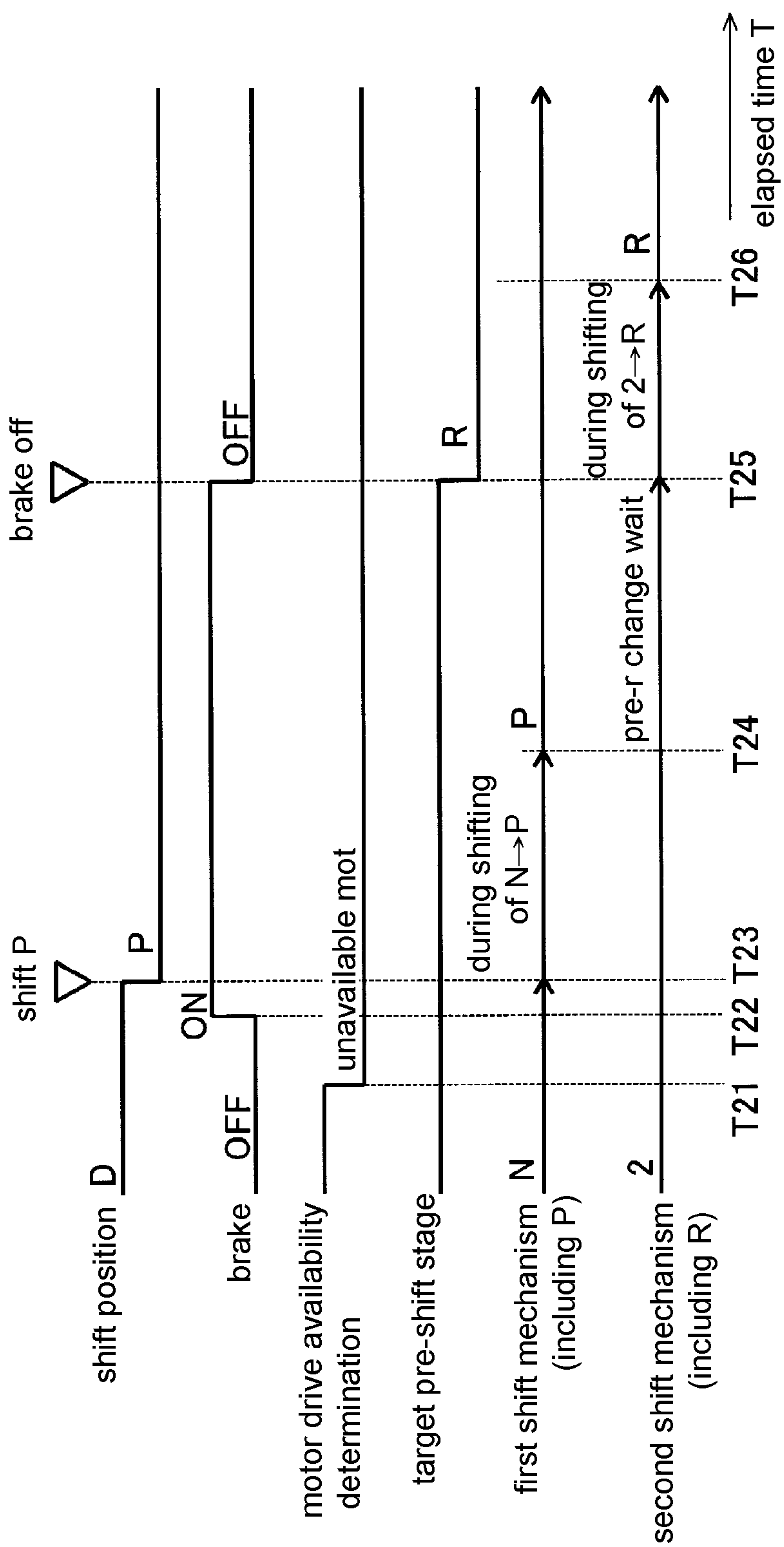
FIG. 5 is a timing chart for describing another procedure in which a pre-shift stage in a parking lock state is set.

FIG. 5 is a timing chart for describing another procedure in which a pre-shift stage in a parking lock state is set to the 2-speed stage. In the timing chart in FIG. 5, it is determined that the vehicle 1 cannot be started (driven) using driving of only the motor 3 at time T21. Subsequently, the brake is switched on through an operation (a stepping operation) of the brake pedal 121 by the driver at time T22. Subsequently, a shift position is switched from the reverse position (R) to the parking position (P) through an operation of the shift lever 110 by the driver at time T23. Since it is determined that the vehicle 1 cannot be started (driven) using the driving of only the motor 3 at this time, a change in the target pre-shift stage in the parking lock state (a change to the reverse stage) is not performed yet at this point of time. Subsequently, an operation of switching a neutral (N) serving as the shift stage (the odd shift stage) which has been set by the first shift mechanism G1 until then to the parking position is performed between time T23 and time T24, and switching to the parking position (P) has been completed at time T24. Subsequently, an operation of changing the 2-speed stage in the second shift mechanism G2 set as a pre-shift stage to a reverse (R) stage is waited between time T24 and time T25. Moreover, when the brake is switched off through a release operation (a stepping release operation) of the brake pedal 121 by the driver at time T25, an operation of changing the target pre-shift stage to the reverse (R) stage and changing the pre-shift stage from the 2-speed stage to the reverse (R) stage is begun at this point of time. An operation of changing the pre-shift stage to the reverse (R) stage has been completed at time T26.

As described above, the transmission 4 in this embodiment is constituted to set a reverse stage (R) using a reverse stage shift mechanism GR and to set a 1-speed stage using the first shift mechanism G1 so that a reverse driving force can be transferred to the drive wheels WR and WL. For this reason, when the pre-shift stage set at the time of the parking lock state is changed to the 2-speed stage (the lowest shift stage which can be set by the second shift mechanism G2), two operations such as an operation associated with a parking lock release and setting of the 1-speed stage by the first shift mechanism G1 (engagement of the 1-speed synchromesh mechanism 41) and an operation associated with a release of the 2-speed stage set by the second shift mechanism G2 and setting of the reverse stage using the reverse stage shift mechanism GR are required as operations of setting a reverse stage using the transmission 4 when a shift position has been changed from the parking position to the reverse position the next time. For this reason, there is a concern about a starting response at the time of rearward movement which cannot be secured. In order to deal with this, in the control illustrated in the timing chart in FIG. 5, if it is determined that the vehicle 1 cannot be started using driving of the motor 3 when the parking lock state of the parking lock mechanism 59 is released as described above, the reverse stage is set using the reverse stage shift mechanism GR as the pre-shift stage set at the time of the parking lock state. Thus, since the vehicle can be started in reverse (rearward) using only an engagement operation of the parking lock release and the 1-speed synchromesh mechanism 41 even when the vehicle 1 cannot be started using a driving force of the motor 3, a response delay when the vehicle is started rearward can be avoided. Note that, since the vehicle can be started ill reverse (rearward) by driving the motor 3 in reverse if the vehicle can be started using driving of the motor 3 when a parking lock is released, the 2-speed stage is set as a pre-shift set at the time of the parking lock state. Thus, noise and vibration generated due to a release of the parking lock state can be effectively reduced.

Also, when the driver in the vehicle 1 performs the operation of selecting the parking position using the shift lever 110, basically, the operation is performed while the brake pedal 121 is being stepped. For this reason, when the parking position is selected by the shift lever 110 after an operation has been performed on the brake pedal 121, subsequently, it can be determined that the driver is less likely to start the vehicle 1 again if the operation associated with the brake pedal 121 is cancelled. Thus, in the control illustrated in FIG. 5, when the parking position is selected through the operation performed on the shift lever 110 after a stepping operation has been performed on the brake pedal 121, waiting is performed without performing an operation of setting the reverse stage as a pre-shift stage until a cancel of the stepping operation performed on the brake pedal 121 is detected. Thus, since an operation of switching (changing) the pre-shift stage in the parking lock state to the reverse stage is performed after a shift position selected by the shift lever 110 due to the driver's intention change (a so-called change in mind) in the vehicle 1 is less likely to be changed from the parking position to another travel position, a decrease in starting response of the vehicle 1 can be effectively suppressed even when the driver's intention has been changed.

Since an operation of setting the shift lever 110 after the driver steps on the brake pedal 121 once again to a travel position for the driver to start the vehicle again is performed, there is a temporal room when the pre-shift stage in the parking lock state is changed (switched) in this case.

On the other hand, when an operation of setting the shift operator to the parking position using the shift lever 110 is performed without the brake pedal 121 being stepped, the operation may be performed immediately without waiting a change in the preparation shift stage in the parking lock state.

Figure 6:
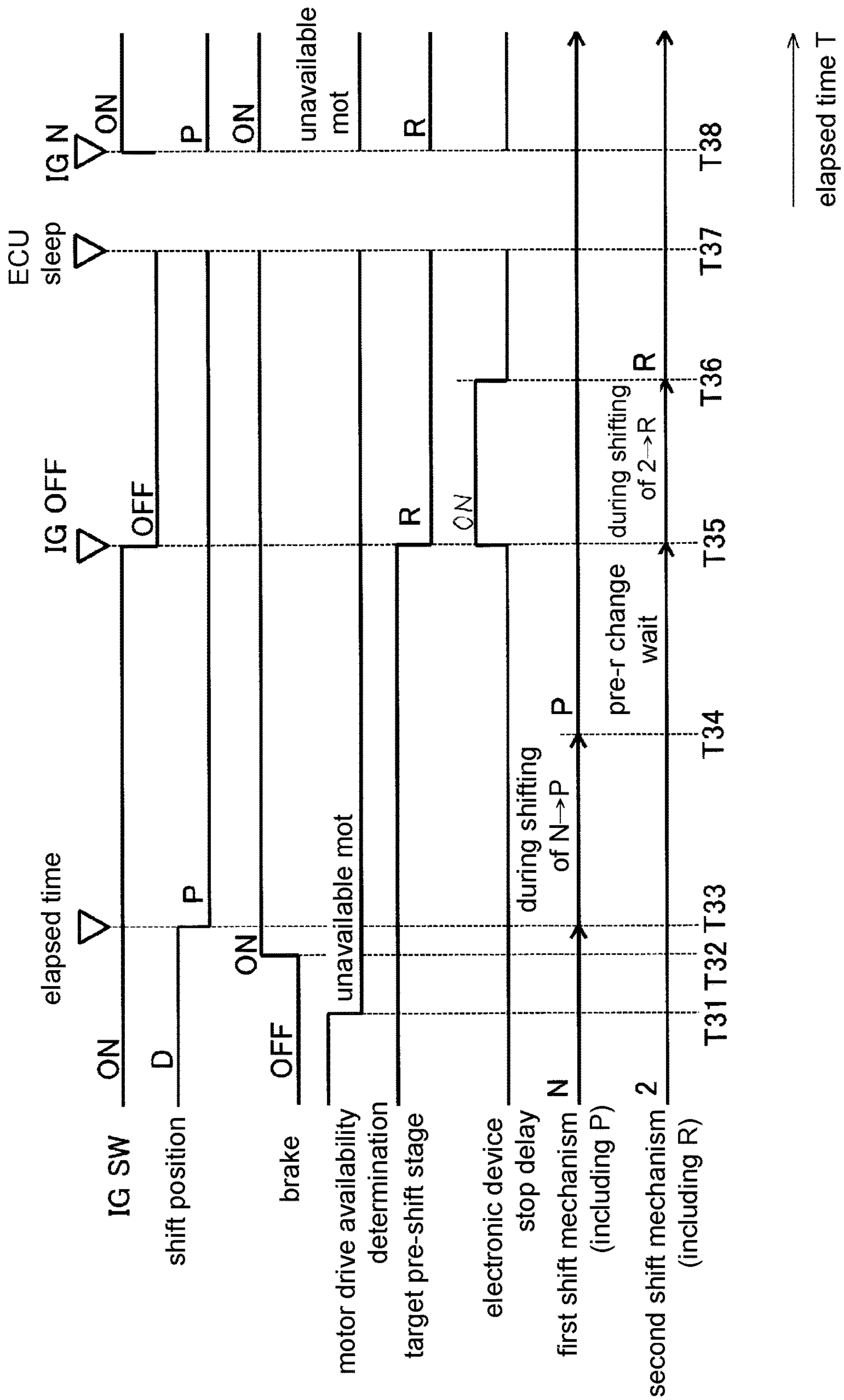
FIG. 6 is a timing chart for describing a procedure in which a pre-shift stage in a parking lock state is set when ignition is turned off before braking is switched off.

FIG. 6 is a timing chart for describing a procedure in which a pre-shift stage in a parking lock state is set when ignition is turned off before braking is switched off. The timing chart in FIG. 6 illustrates on and off of an ignition switch 107, a shift position selected through an operation of the shift lever 110 by the driver, the presence and absence (on and off of the brake) of operation of the brake pedal 121 by the driver, determination concerning whether the vehicle 1 can be started (driven) using driving of only the motor 3 (motor drive availability determination), on and off of a delay timer associated with stop of an electronic device including the ECU 10 mounted in the vehicle 1, and changes in elapsed time T in the target pre-shift stages in the first shift mechanism G1 and the second shift mechanism in the transmission 4.

In the timing chart in FIG. 6, it is determined whether the vehicle 1 cannot be started (driven) using the driving of only the motor 3 at time T31. Subsequently, the brake is switched on through the operation (the stepping operation) performed on the brake pedal 121 by the driver at time T32. Subsequently, a shift position is switched from the reverse position to the parking position through the operation of the shift lever 110 by the driver at time T33. Since it is determined that the vehicle 1 cannot be started (driven) using the driving of the motor 3 at this time, the target pre-shift stage in the parking lock state is not changed (changed to the reverse stage) yet at this point of time. After that, an operation of switching the neutral (N) serving as the shift stage (the odd shift stage) which has been set by the first shift mechanism G1 until then to the parking position (P) is performed between time T33 and time T34, and switching to the parking position (P) has been completed at time T34. Subsequently, an operation of changing the 2-speed stage in the second shift mechanism G2 which has been set as a pre-shift stage to the reverse stage is waited (without performing the operation) between time T34 and time T35. The target pre-shift stage is changed to the reverse stage (R) at this point of time after the ignition switch 107 has been switched off using the operation by the driver at time T35, and an operation of changing the pre-shift stage from the 2-speed stage to the reverse stage is begun. An operation of changing the pre-shift stage to the reverse stage has been completed at time T36. Furthermore, the delay timer associated with stop of the electronic device including the ECU 10 is turned between time T35 at which the ignition switch 107 has been switched off and time T36 at which the operation of changing the pre-shift stage to the reverse stage has been completed so that the stop of the electronic device is waited (delayed). After that, the electronic device has a sleep (stop) state at time T37. In other words, when the ignition switch 107 is switched off, a change of the target pre-shift stage to the reverse stage is performed regardless of on and off of the brake. After that, the ignition switch 107 is switched on again at time T38. The pre-shift stage has been already set to the reverse stage at this time.

An electronic mechanism including the ECU 10 in the vehicle is stopped while the reverse stage is not set as a pre-shift stage set at the time of the parking lock state when the ignition is turned off while the driver in the vehicle 1 is stepping on the brake pedal 121, and thus there is a concern about a response of a rearward start of the vehicle 1 at the time of starting the next time which is delayed. Thus, in the control illustrated in FIG. 6, when it has been detected that the ignition is turned off before it is detected that the operation of the brake pedal 121 is cancelled as described above, the reverse stage is set as the pre-shift stage set at the time of the parking lock state when it has been detected that the ignition is turned off. In other words, when the ignition has been turned off while the drivers steps on the brake pedal 121, the reverse stage is set as a pre-shift stage of a parking lock when the ignition is turned off. Thus, if the vehicle 1 is started when the ignition is turned on the next time, a response delay occurring when the vehicle 1 is started in reverse can be effectively prevented even when the vehicle cannot be started using the driving force of the motor 3.

Also, when it is determined that electricity cannot be stored normally in the 12 V battery 22 such as when the DC-DC converter (the transformer) 21 fails, the 12 V battery 22 needs to be prevented from being depleted (extremely decreased in an amount of stored electricity). For this reason, in the present invention, when it is determined that electricity cannot be stored normally in the 12 V battery 22, an operation of setting the reverse stage is not performed as the pre-shift stage set at the time of the parking lock state. Thus, a decrease in amount of electricity stored in the 12 V battery 22 is minimized even when electricity cannot be stored normally in the 12 V battery 22 so that depletion of the 12 V battery 22 can be prevented.

Note that the control when it is determined that electricity cannot be stored normally in the 12 V battery 22 is performed separately from the above-described control illustrated in FIGS. 4 to 6. Therefore, for example, in the timing chart illustrated in FIG. 4 and the like, an operation of changing the pre-shift stage of the parking lock stage to another shift stage is not performed when it is determined that electricity cannot be stored normally in the 12 V battery 22 even when it has been determined that the pre-shift stage of the parking lock state is changed to another shift stage.

The transmission 4 in this embodiment is constituted such that a ring gear 75 in the planetary gear mechanism 70 provided in a rotating shaft in the motor 3 is fixed to a case and the 1-speed synchronous engagement mechanism 41 is provided between the planetary carrier 73 and the 3-speed driving gear 43. For this reason, when the parking lock mechanism 59 is set to the parking lock state, the 3-speed driving gear 43 and the planetary carrier 73 are separated using the 1-speed synchronous engagement mechanism 41. For this reason, an inertial mass (an inertia) of the parking gear 54 and members integrally coupled on the sides of the drive wheels WR and WL from the output shaft CS is significantly reduced as compared with, for example, a transmission of type in which a 3-speed driving gear and a planetary gear mechanism are directly joined such as the transmission disclosed in Japanese Unexamined Patent Application Publication No. 2015-175463. For example, the reduced inertial mass (the inertia) is approximately ¼ or less of the inertial mass of the transmission disclosed in Japanese Unexamined Patent Application Publication No. 2015-175463. As described above, the inertial mass of the parking gear 54 and the members on the sides of the drive wheels WR and WL from the output shaft CS is reduced, and thus there is a concern about a torque of the drive shaft which is not sufficiently attenuated. Thus, a torque fluctuation speed and a frequency of the drive shaft increase. Therefore, there is a problem about deteriorated noise and vibration when parking of the parking lock mechanism 59 has been released.

On the other hand, in the control of the transmission 4 in this embodiment, the pre-shift stage set by the second shift mechanism G2 is set as the 2-speed stage when the parking lock mechanism 59 has the parking lock state. A state in which the pre-shift stage of the 2-speed stage has been set is changed to a state in which the driving gear 42 of the 2-speed stage has been joined to the output shaft CS by the second engagement switching mechanisms 83 and 84 so that a larger inertial mass can be secured as an inertial mass (an inertia) of members joined to the parking gear 54 and the output shaft CS. Thus, noise and vibration occurring when the parking lock state of the parking lock mechanism 59 is released can be effectively reduced.

Although the embodiment of the present invention has been described above, the present invention is not limited to the above-described embodiment, and various modifications can be performed without departing from the technical idea disclosed in the claims, the specification, and the drawings. For example, a detailed configuration of the transmission shown in FIGS. 2 and 3 is merely an example, and as long as the transmission (the twin clutch type transmission) according to the present invention is a transmission including at least the basic configuration shown in FIG. 1, the detailed configuration is not limited to the configuration shown in FIGS. 2 and 3 and may include other configurations.

Also, the transmission 4 illustrated in the above-described embodiment is a transmission with a configuration in which the rotating shaft in the motor 3 is joined to the inner rotating shaft (the first input shaft) IMS in which the first shift mechanism G1 configured to set the odd shift stage, but although now shown in the drawings, the rotating shaft in the motor is joined to a rotating shaft in which a shift mechanism configured to set an even shift stage is provided in addition to this.

What is claimed is:

1. A control device in a hybrid vehicle; comprising:
- an internal combustion engine and an electric motor serving as drive sources of the hybrid vehicle;
- a transmission including:
- a first input shaft connected to the electric motor and optionally connected to an engine output shaft in the internal combustion engine with a first clutch;
- a second input shaft optionally connected to the engine output shaft in the internal combustion engine with a second clutch;
- an output shaft configured to output power toward drive wheels;
- a first shift mechanism including a plurality of shift gears provided between the first input shaft and the output shaft and a first engagement switching mechanism which optionally engages any of the plurality of shift gears with the first input shaft or the output shaft and by which any one of odd shift stages and even shift stages is able to be set;
- a second shift mechanism including a plurality of other shift gears provided between the second input shaft and the output shaft and a second engagement switching mechanism which optionally engages any of the plurality of other shift gears with the second input shaft or the output shaft and by which the other of the odd shift stages and the even shift stages is able to be set;
- a reverse stage shift mechanism configured to be able to set a reverse shift stage disposed between the first input shaft and the output shaft; and
- a parking lock mechanism configured to include a parking lock gear provided in the output shaft and a meshing member which is able to be meshed with the parking lock gear and lock the output shaft by meshing the meshing member with the parking lock gear; and
- a control unit configured to control driving of the hybrid vehicle using the internal combustion engine and the electric motor,
- wherein the control unit selects a lowest shift stage which is able to be set by the second shift mechanism as a preparation shift stage set when the parking lock mechanism is a parking lock state.

2. The control device in the hybrid vehicle according to claim 1, wherein the transmission is constituted such that a reverse stage is set by the reverse stage shift mechanism and a reverse driving force is able to be transferred to the drive wheels by setting the lowest shift stage in the first shift mechanism, and the control unit sets the lowest shift stage which is able to be set by the second shift mechanism as a preparation shift stage set at the time of the parking lock state if it is determined that the hybrid vehicle can be started using driving of the electric motor when a parking lock of the parking lock mechanism is released, and sets a reverse shift stage using the reverse stage shift mechanism as a preparation shift stage set at the time of the parking lock state if it is determined that the hybrid vehicle cannot be started using the driving of the electric motor when the parking lock of the parking lock mechanism is released.

3. The control device in the hybrid vehicle according to claim 2, comprising:

a storage battery configured to supply electric power used to drive the electric motor; and a remaining capacity detection unit configured to detect a remaining capacity of the storage battery, wherein the control unit determines whether the hybrid vehicle is able to be started using the driving of the electric motor on the basis of the remaining capacity of the storage battery detected by the remaining capacity detection unit.

4. The control device in the hybrid vehicle according to claim 3, wherein the storage battery is a high voltage storage battery which is able to exchange electric power with the electric motor, and includes a transformer which is able to at least step down electric power from the electric motor or the high voltage storage battery, and a low voltage storage battery which is able to exchange electric power between the high voltage storage battery and the electric motor with the transformer, and an actuator mechanism configured to operate operation units in the transmission is constituted to operate using electric power supplied from the low voltage storage battery, and when it is determined that electricity is unable to be stored normally in the low voltage storage battery, the control unit prohibits an operation of changing the preparation shift stage set at the parking lock state.

5. The control device in the hybrid vehicle according to claim 2, comprising:

a shift operation unit by which a driver in the hybrid vehicle performs a selection operation of a shift position;

a shift position detection unit configured to detect the shift position selected by the shift operation unit; and a brake operator operated by the driver to brake the hybrid vehicle, wherein the control unit waits without performing an operation of setting the reverse shift stage as a preparation shift set at the time of the parking lock state until a release of an operation of the brake operator is detected when a parking position is detected by the shift position detection unit after the operation of the brake operator has been detected.

6. The control device in the hybrid vehicle according to claim 5, comprising:

a start and stop operator configured to operate start and stop an electronic mechanism including the control unit mounted in the hybrid vehicle, wherein, when a stop operation of the electronic mechanism by the start and stop operation unit has been detected before the release of the operation of the brake operator is detected, the control unit performs an operation of setting the reverse shift stage as a preparation shift stage set at the parking lock state when the stop operation has been detected.

* * * * *